UNITED STATES PATENT OFFICE.

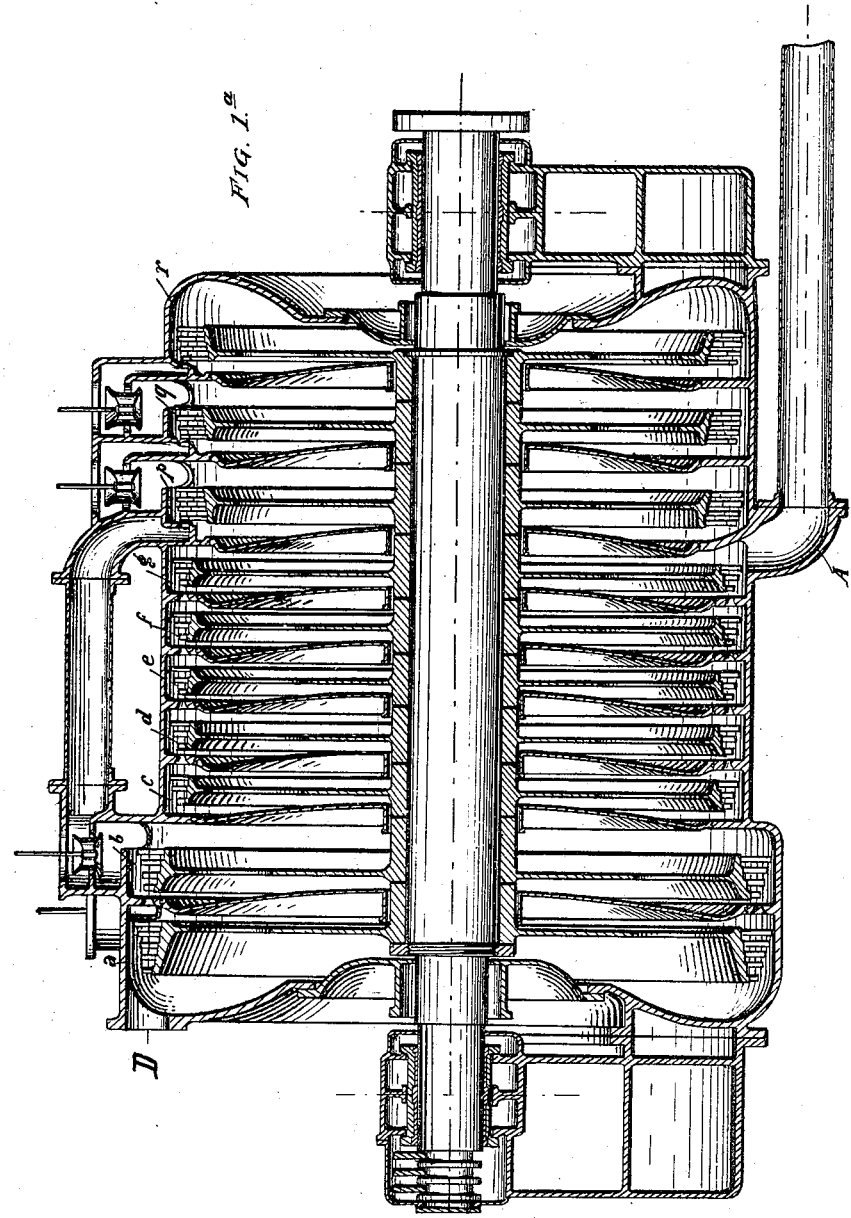

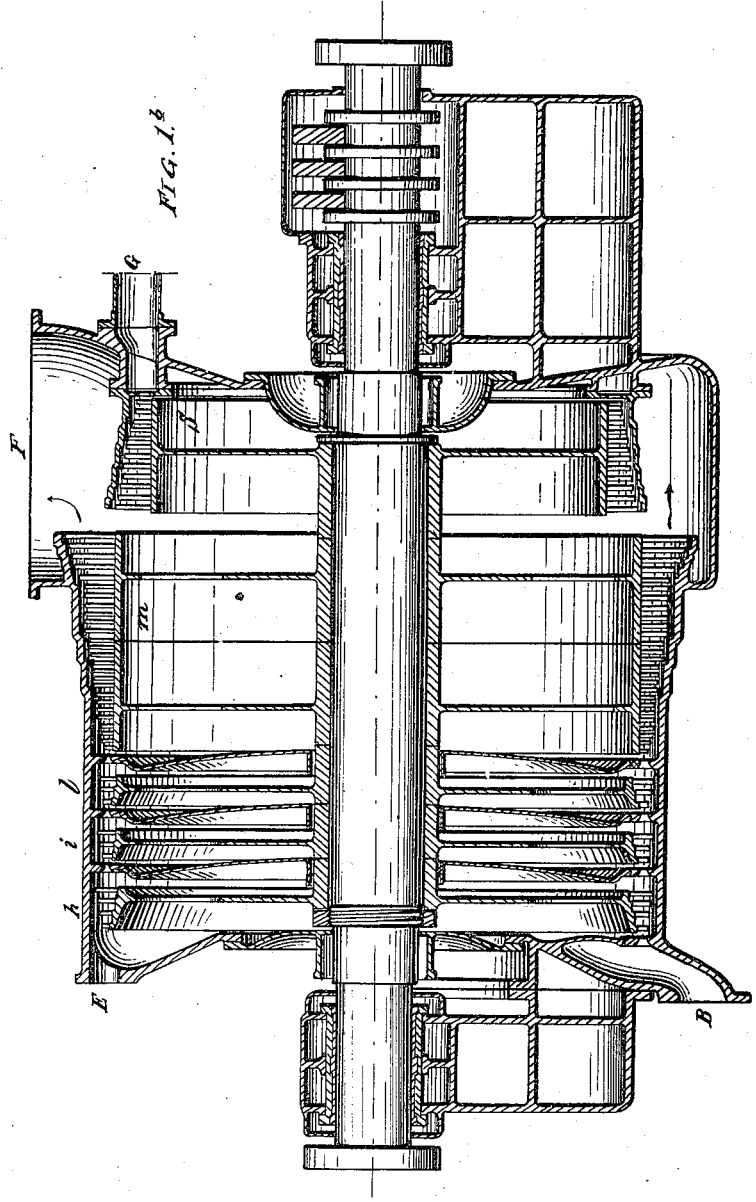

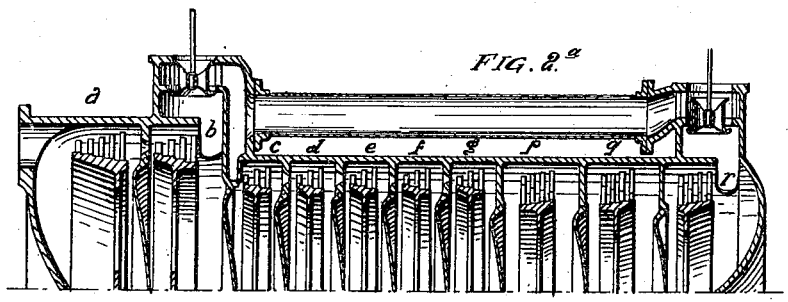
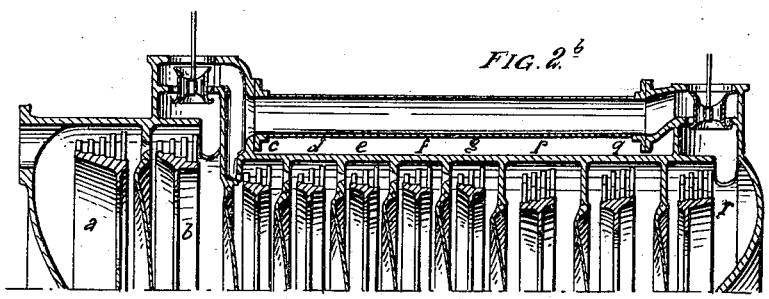
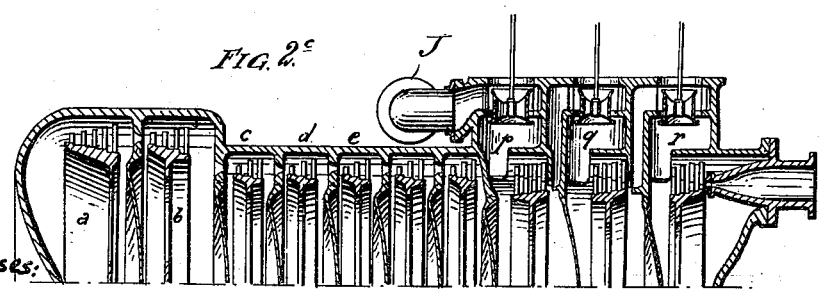

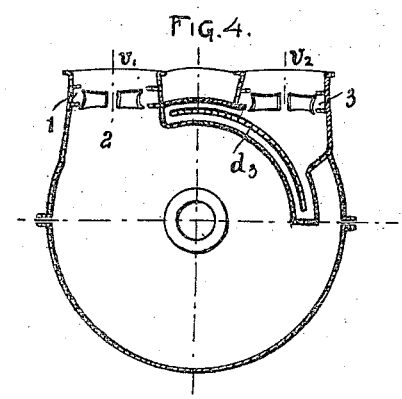
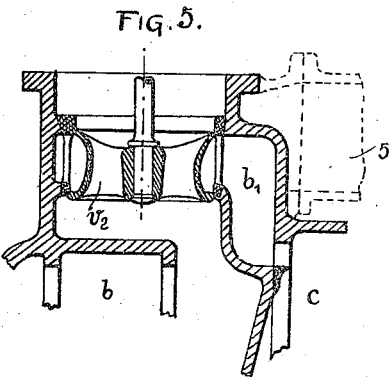
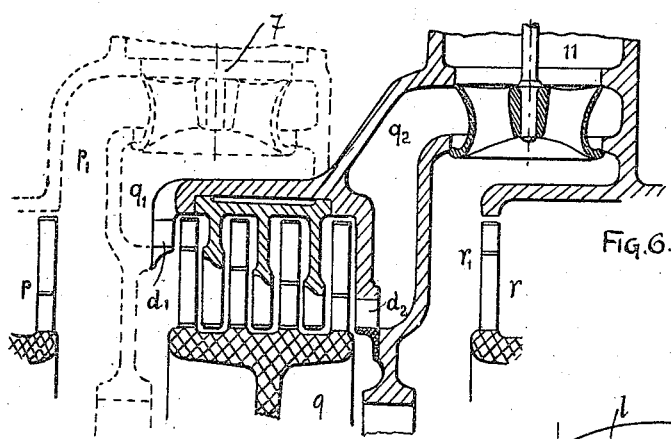
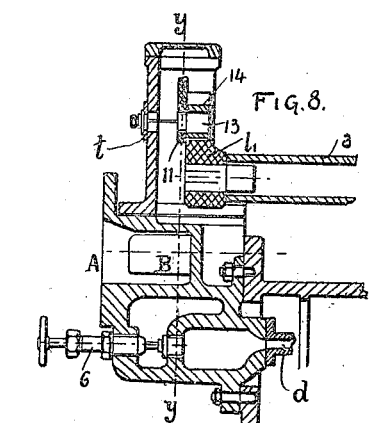
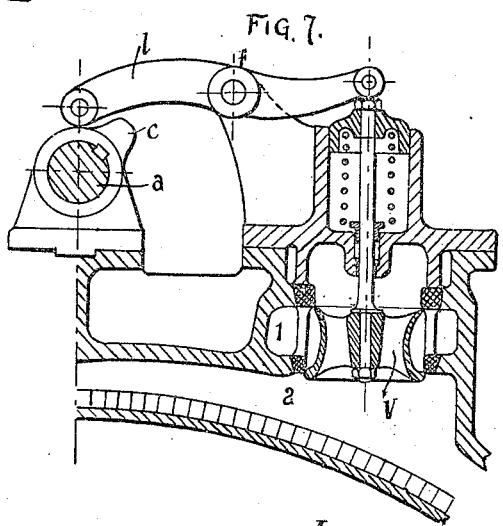

GIUSEPPE BELLUZZO, OF MILAN, ITALY.

STEAM-TURBINE.

1,243,131.   Specification of Letters Patent.   Patented Oct. 16, 1917.

Application filed January 23, 1913. Serial No. 743,745.

*To all whom it may concern:*

Be it known that I, GIUSEPPE BELLUZZO, professor of mechanical engineering, a subject of the King of Italy, residing in the city of Milan, Italy, have invented certain new and useful Improvements in Steam-Turbines, of which the following is a full, clear, and exact description, reference being had to the accompanying drawings, forming a part of this specification.

This invention relates to steam turbines and more particularly to steam turbines adapted for use in steam vessels, and its primary object is to provide improved arrangements and constructions of parts whereby a great efficiency will be combined with capacity of giving a considerable number of speeds and with an easily controllable regulation of the same.

A further object of this invention is to provide a special construction and arrangement of turbine wheels capable of rotating in two opposite directions, and simple and convenient controlling means for the same.

A still further object is to provide in connection with a novel construction and arrangement of turbine wheels, means of a novel and improved character under the direct control of the operator for changing the cycle of the steam through said wheels and for regulating the quantity of steam sent through the same, according to the speed and direction of rotation desired.

With these and other objects in view as will more fully appear as the description proceeds, this invention consists in certain novel and improved constructions and arrangements of parts as will be hereinafter fully described and claimed in the appended claims.

The turbine forming the object of the present invention is formed in a single group or in two separate groups respectively for the high and the low pressure, these to be mounted on the same or on parallel shafts, and having the following general characteristics:

The first or the first two high pressure wheels have a larger number of circumferential series of blades and a larger diameter than the remaining high pressure wheels, or in other words, have a larger surface of action.

The object of this arrangement is to have in the first wheel or wheels a higher circumferential velocity than in the other ones, it being understood that all the wheels are fixed on the same shaft and therefore have the same angular velocity; this with the view of obtaining at the cruising speed (at which in my turbine the steam flows out of the guiding blades at about the same velocity it has at the maximum speed), a ratio between said velocity of outflow and the circumferential velocity much lower than in the turbines heretofore used (about 20 instead of 40). By such an arrangement the efficiency of the first wheel or wheels can be greater than that obtained by other turbine makers.

If the turbine is formed in one single group comprising the high and the low pressure, the last wheels are each provided with four or more circumferential series of blades divided in two parts, having an opposite curvature, for the rotation in two opposite directions; if the turbine is formed in two groups, the wheels with four circumferential series of blades with double curvature are mounted at the end of the high pressure group. The last wheel with double curved blades can also have five circumferential series of such blades instead of four.

If the turbine is formed in two coaxial groups, high and low pressure, the two shafts are connected by a joint that can be disconnected when it is desired to run the low pressure turbine only; to this end the first wheel of the low pressure group has a number of circumferential series of blades larger than the remaining low pressure wheels (generally being provided with four or five series instead of three), and in front of the same at the top is mounted a distributer having nozzles sending steam to said wheel, and receiving said steam directly from the mains, said distributer allowing for an expansion of said steam equal to the one taking place in the first sectional chamber of the low pressure turbine when the same is working in series with the high pressure turbine. In other words, the expansion of steam in said distributer is higher than in the distributer located in front of the first high pressure wheel, and therefore has a higher ratio between its minimum section and its outlet section.

Said distributer which can be regulated in any convenient manner, is also useful for supplying supplementary steam to the low pressure drum when it is desired to raise the power exerted by the power plant, or when it is necessary to regulate the power on the shaft controlled by the low pressure turbine in case the shafts should be more than two and the action of the high and the low pressure should be divided between the various shafts.

The annexed drawings illustrate by way of example some of the ways of putting my invention into practice, and in the same:

A turbine comprising two separate groups is shown in Figures 1ª 1ᵇ; the former being an axial section of the high pressure group and the latter an axial section of the low pressure group.

All of the Figs. 2ª 2ᵇ 2ᶜ refer to the high pressure group and are sections made on vertical planes successively displaced about ⅛ of the diameter with respect to the middle vertical plane of the turbine.

Fig. 2ª in combination with Fig. 1ª shows the course of the steam when the turbine is running at reduced speed (cruising speed).

Fig. 2ᵇ shows the course of the steam when the turbine is running at full speed.

Fig. 2ᶜ shows the same course when the turbine is moving in the reverse direction, i. e. during the backward run of the vessel.

Fig. 4 is a schematic front sectional view in elevation in correspondence of the exhaust from wheel $b$ of Fig. 1;

Fig. 5 is a detail side sectional view in elevation on an enlarged scale, illustrating the passage of steam in the high pressure from one group to the successive group of wheels for rotation in the normal direction;

Fig. 6 is a detail side sectional view in elevation on the same scale illustrating the passage of steam from one group to the following group of wheels for the rotation in two opposite directions;

Fig. 7 is a detail front sectional view in elevation illustrating the way in which the valves are controlled;

Figure 9:
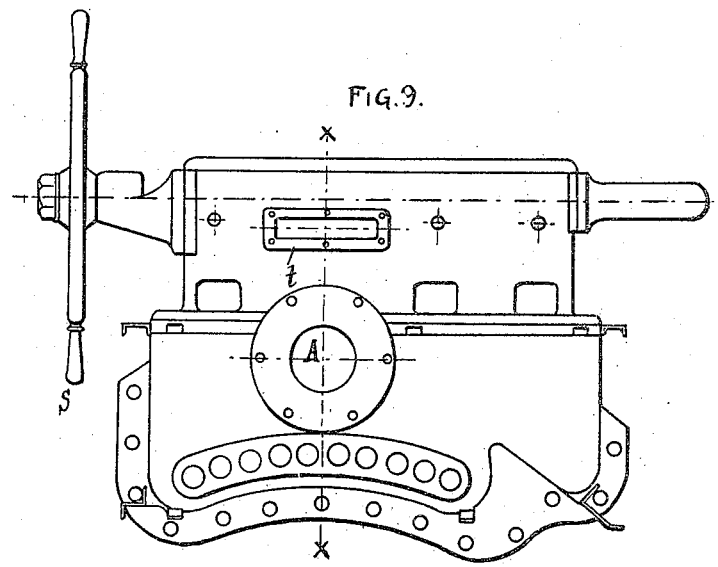
Figure 10:
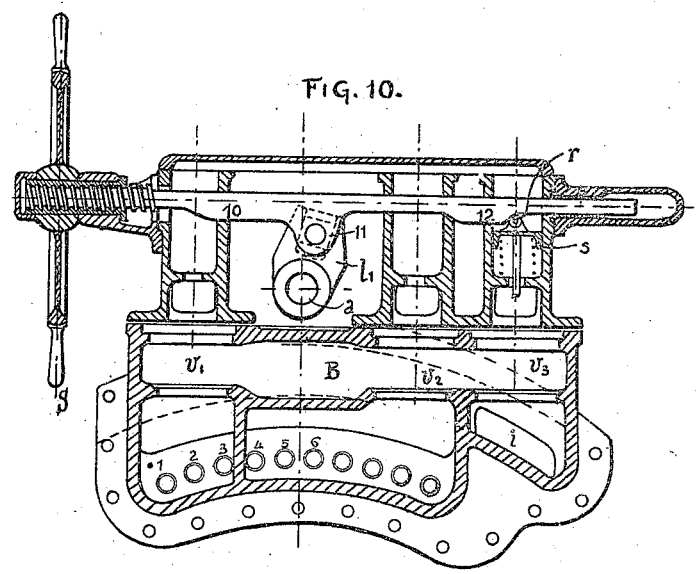

Figs. 8, 9, and 10 are respectively a detail side sectional view in elevation, a front view in elevation, and a sectional front view in elevation of the devices for admitting steam to the high pressure turbine.

Figure 12:
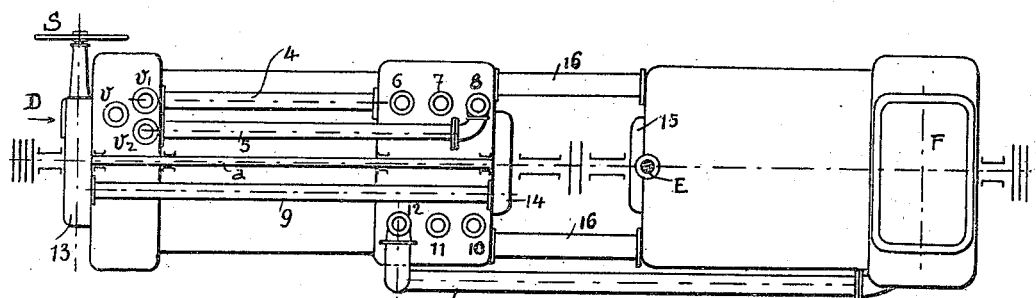
Figure 11:
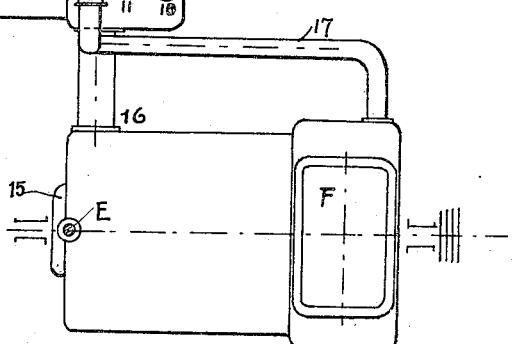
Figure 13:
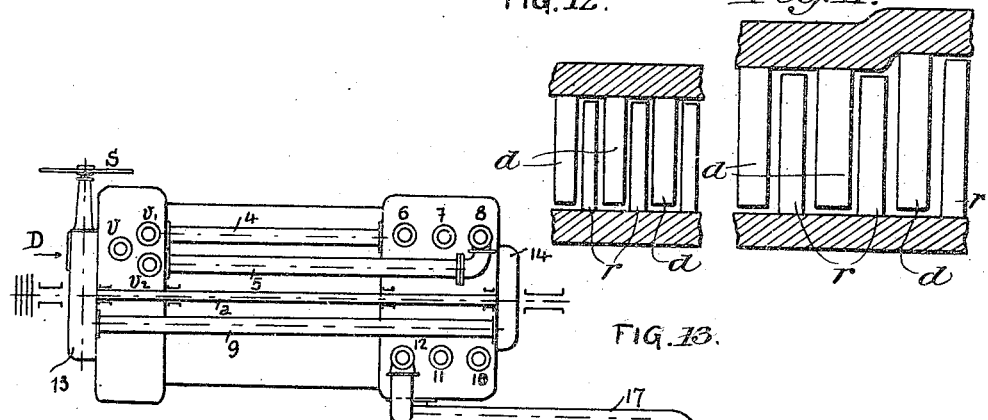

Fig. 11 is a detail longitudinal sectional view in elevation showing the relative arrangement of the rotating blades and the stationary distributer blades of the low pressure drum;

Figs. 12, 13 are respectively a schematic plan view of the turbine illustrated in Fig. 1, and a schematic plan view of a group comprising a high and a low pressure turbine mounted on parallel shafts.

The high pressure group is formed by wheels $a, b, c, d, e, f, g$, for the forward motion and by wheels $p, q, r$, for both the forward and the backward motion, that is, provided with double circumferential series of blades curved in opposite directions. The low pressure group is formed by wheels $h, i, l$ and by drum $m$, for the forward motion, and by drum $s$ for the reverse motion.

Wheels $a$ and $b$ have respectively five and four circumferential series of blades; $p, q, r, h$ have four series, and the remaining wheels have three. At the reduced forward speed of the vessel and of the turbine, and with proper arrangement of valves and connections, the steam flows in series through the following wheels:

$a, b, p, q, r, c, d, e, f, g, h, i, l, m$—

In wheels $p, q,$ and $r,$ the action of the steam is exerted on the external portion of the double blades. For speeds from 0.7 to the maximum speed of the vessel and therefore of the turbine, the steam acts in series on wheels:

—$a, b, c, d, e, f, g, h, i, l, m,$—

For the reverse motion the steam acts in series on wheels $r, q,$ and $p,$ working on the internal portion of the blades and on drum $s,$ If the high pressure and low pressure groups are inclosed in the same casing the course of the steam is the same as previously described.

Figure 3:
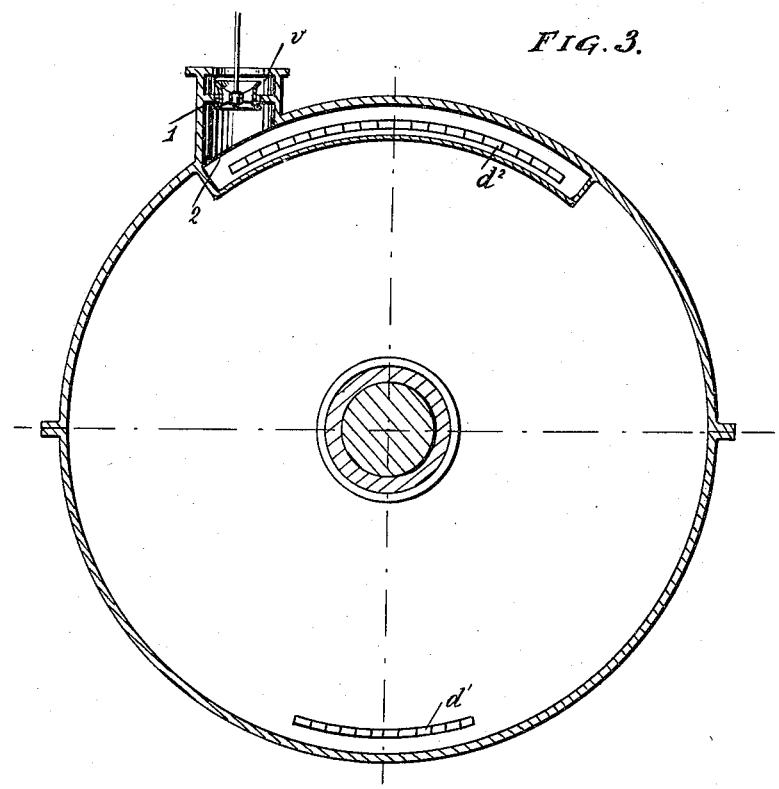
Fig. 3 is a schematic front sectional view in elevation in correspondence of the admission to wheel $b$.

Two main valves $v_1$ $v_2$ (Fig. 10) establish communication of the two groups of inlets with the steam arriving from the boiler. In front of wheel $b$, as seen in the transversal section represented in Fig. 3, are two groups of distributers, $d_1$ always open, and $d_2$ which can be closed with a valve when the turbine is running at the reduced speed.

The inlet of steam to the distributer which is in front of wheel $c$ inside is closed with one or two valves at a reduced speed; said valves are open at the maximum speed. In the same manner a valve if open permits the communication between chamber $b$ and the first distributer for the forward motion of wheel $p$, a second valve between the exhaust of this one and the admission to $q$, a third valve between the exhaust of this one and the admission to $r$, a fourth between the exhaust of $r$ and the admission to wheel $c$, that in this action cannot receive the exhaust of wheel $b$, the valve or valves of communication being closed.

Another series of valves permits the communication between the exhaust of wheel $r$ for the reverse motion and the admission to wheel $q$, (reverse motion), between the exhaust of $q$ and the admission to $p$, and between the exhaust of $p$, and the admission to drum $s$.

If the groups of turbines are two for the forward motion, the steam is discharged in chamber A in the lower part of the high pressure turbine, and a conduit leads the same to the admission B of the low pressure;

for the reverse motion the steam is discharged from J (Fig. 2c), and is admitted in G (Fig. 1b). In this case in conduits A, B, connecting the high with the low pressure chamber, will be provided flanges for attaching the exhaust of the auxiliary small turbines that control auxiliary mechanisms such as the circulating and the air pumps.

If the turbine is in one group only, such exhaust steam from auxiliary turbines is discharged in front of drum $m$. When the turbines are operated for the reverse motion said exhausts will instead be discharged in G (Fig. 1b), or in front of drum $s$ with a proper operation of valves which are provided to this end.

In the scheme represented in the drawings, in D is mounted the group of admissions to the high pressure: in E is mounted the distributer that supplies direct steam to the low pressure, in F is the discharge to the condenser.

In the partition between wheels $a$ and $b$, as previously stated, are provided at the lower part, distributing openings $d_1$ of wheel $b$, through which passes the quantity of steam necessary for the low speeds; at the top are provided distributing openings $d_2$ which are supplementing $d_1$ when higher speeds are desired; but to reach the same, as stated, the steam must pass through one or two valves. In Fig. 3 is seen valve $v$, which when it is open, establishes communication between 1 and 2, space 2 being in communication with the discharge of wheel $a$.

In the partition between wheels $b$ and $c$, are provided at the top the distributing openings to wheel $c$, but the steam to arrive to the same must also pass through one or two valves, which together with valves previously mentioned, are closed at the low speeds and open at the higher speeds.

Along the cylindrical part of the sectional chamber in which rotates wheel $b$, is finally mounted a valve which is only open at the reduced speeds, and which establishes communication between chamber $b$ and the distributer for the forward motion of wheel $p$.

In Fig. 4 is represented a schematic section made at the discharge side of wheel $b$ of Fig. 1; in the same valve $v_1$ is the one that conducts the steam discharge from wheel $b$ from 2 to 1, and from 1 to wheel $p$; $v_2$ is instead the valve establishing communication between the discharge of $b$, this discharge being in communication with 3, and the distributer $d_3$ of wheel $c$.

In Fig. 5 is represented in a larger scale the arrangement for the passage of steam from a group of wheels to another through a valve, and particularly through valve $v_2$ of Fig. 4, between wheels $b$ and $c$. In said figure $v_2$ indicates the balanced valve that when open establishes communication between chamber $b$ and chamber $b_1$. In said figure is also represented in dotted lines pipe 5 that from the discharge of wheel $r$ for the forward motion leads the steam to chamber $b_1$ and then to the distributers of wheel $c$ also when valve $v_2$ is closed.

Fig. 6, which is relative to a section made with an axial plane, indicates the details relating to the passage of steam in wheels $p$, $q$, $r$. The section indicated in full lines represents the valve 11 which when open leads the steam discharged from wheel $r$ in $r_1$, from $r_1$ to $q_2$ to the distributers of a reverse motion $d_2$. The dotted lines represent instead the valve 7 which is closed when valve 11 is open, and is open at the low speeds to lead the exhaust steam of wheel $p$ from $p_1$ to $q_1$ and then to the distributers $d_1$ of forward motion of wheel $q$.

From the foregoing it can be seen that it is necessary to effect synchronous movements of the groups of valves mounted at the higher part of the turbine in correspondence with the high pressure of forward and reverse speeds, according to the speed direction or rotation of the turbine which are desired.

Each of these valves is mounted as previously described and is controlled as indicated in Fig. 7; this represents the top part of a section made through the turbine in a plane perpendicular to the axis in correspondence of any one of the said valves.

In said figure $v$ indicates the valve opening toward the lower side and establishing communication between chamber 1 where the exhaust steam of one wheel arrives, with the chamber 2 on which the distributers of the succeeding wheel open.

Along the high pressure turbine above the same is mounted an operating shaft shown in section and designated by $a$ in said Fig. 7; the same is provided with as many cams as there are valves to operate, said cams being arranged in such a manner that according to the annular position of said shaft $a$, all the valves for the forward motion will be open or those for the reverse motion.

It is thus obvious that rotating shaft $a$ in the direction opposite to that of a clock's hands, cam $c$ will operate lever $l$ around fulcrum $f$ and will cause the opening of valve $v$ (Fig. 7). Simultaneously with the operation of shaft $a$, the operation of the main admission valves must also be effected and to this end at the front part of the turbine are mounted the steam admitting and distributing devices represented in Figs. 8, 9, and 10.

The steam arrives from the boiler through the opening A in a chamber B, in which are mounted three balanced valves in correspondence of $v_1$, $v_2$, $v_3$ (Fig. 10). When valve $v_1$ is open the steam can be admitted to a group comprising a few elementary distributing valves, as many as necessary to give steam for the low or cruising speeds.

In Fig 10, (section Y Y of Fig. 8) are indicated in 1, 2, 3, the seats of such valves. When besides valve $v_1$, valve $v_2$ is also open, the steam can be admitted to additional elementary valves, 4, 5, 6, etc. and therefore the speed of the turbine will be higher than the previous one. By keeping valves $v_1$ and $v_2$ closed, and opening valve $v_3$, steam will be sent into the conduit $i$ (Fig. 10) and from this to the distributer for reverse motion of wheel $r$.

In Fig. 8 which has a section through X X of Fig. 9 the distributer $d$ for the forward motion of wheel $a$ and the elementary valve 6 with the relative controlling devices are shown in section.

The operation of the various valves is effected as follows:

A hand wheel S (Figs. 9, 10), which is within reach of the engineer, controls a bar 10—12, having the special outline indicated in Fig. 10; when said bar is moved toward the left it will cause the lowering and therefore the successive opening of the valve inserted in $v_1$ and $v_2$; when said bar is moved toward the right, it will cause the lowering of valve $v_3$; the lowering of said valves is caused by cam-surfaces provided in the said bar, operating against a roller $r$, which is mounted on a little piston $s$, which is connected to the valve rod and which is shown in Fig. 10 only for valve $v_3$.

Bar 10—12 has also a lug 11 (Figs. 8, 10), on which is fixed a pin 13 inserted through sliding part 14. Said sliding part slides in a slot provided in lever $l_1$, which is mounted on the shaft $a$ bearing the cams controlling the various valves; therefore the motion of bar 10—12 will cause the motion of shaft $a$, and its various positions can be indicated by means of an index finger on a plate $t$, on which the various combinations of direction and speed of the vessel are marked.

When the turbine is stationary the three hand valves provided in $v_1$, $v_2$, $v_3$, are closed while those in the turbine establishing communication from $b$ to $p$, $p$ to $q$, $q$ to $r$, $r$ to $c$, for the forward motion at low speeds remain slightly open. Operating bar 10—12 so as to cause the opening of valve $v_1$ said other valves will be completely open, and opening elementary valve 1, the turbine will rotate at its lowest speed, opening 2 and 3 at the cruising speed. Continuing to turn hand wheel S thus moving bar 10—12 toward the left valve $v_1$ will remain open and valve $v_2$ will also be open. Communication between $b$ and $p$, $p$ and $q$, $q$ and $r$, $r$ and $c$ will be closed and communication at the top between $a$ and $b$, $b$ and $c$, will be open.

The turbine under these conditions can run at various higher speeds, according to the number of elementary valves, 4, 5, 6, etc. open besides 1, 2 and 3.

Rotating the hand wheel in the opposite direction, said valves $v_1$, $v_2$, will be closed, and valve $v_3$ will be open, and at the same time by means of shaft $a$, the valves that admit steam from $r$ and $q$, from $q$ to $p$, from $p$ to drum $s$ will also be open. Bar 10—12 can also be controlled by means of a single separate steam cylinder combined with the hand control. Such an arrangement will be especially suitable for large turbines also because the same gives the possibility of control from any point of the vessel.

In Figs. 12, 13, is represented a schematic assemblage of the two high and low pressure turbines in case the same are mounted on the same axis or on parallel axes.

In both figures D indicates the flange to which is attached the hand steam pipe leading steam to the distributer 13; —$a$— indicates the shaft control of the various valves, and S the controlling hand wheel. The valves that establish communication between the top distributer of wheel $b$ with the exhaust of wheel $a$ is designated by $v$; $v_2$ indicates the valve establishing communication between the exhaust of wheel $b$ and the admission to wheel $c$; $v_1$ designates the valve and 4 the connecting pipe from the exhaust of wheel $b$ to the admission of wheel $p$ forward motion; 6 designates the valve establishing communication between the exhaust of wheel $p$ and admission to wheel $q$ forward motion; 7 the valve establishing communication between the exhaust of $q$ and the admission to $r$; 8 the valve and 5 the pipe establishing communication between the exhaust of wheel $r$ and the admission to wheel $c$. Valves $v_1$, 6, 7, and 8 are either closed or open at the same time.

9 indicates the piping admitting steam from the distributer in front to group 14 for the reverse motion. The valves establishing communication for the reverse motion between the exhaust of wheel $r$ and the admission to wheel $q$, the exhaust of wheel $q$ and the admission to wheel $p$, the exhaust of wheel $p$ and through pipe 17, the low pressure drum for the reverse motion are respectively designated by 10, 11 and 12.

16 designates the connections between the high and the low pressure for the forward motion. E indicates the flange to which is attached the steam main leading steam to the distributer 15 for the forward motion for the low pressure, F indicates the discharge to the condenser.

It is to be understood, of course, that the distributer 15 for the low pressure turbine is substantially the same in construction as the distributer for the high pressure turbine.

A modified form of the turbine described may be had by an arrangement of the various wheels whereby the wheels provided with double curved blades $p, q, r$, are mounted in front instead of being at the rear of the high turbines. In this case it is obvious that for the forward motion for low and cruising speeds, the steam must run in series through wheels $p, q, r, a, b, c, d, e, f, g, h, i, l, m$, while at the high speeds the same will be admitted to wheel $a$ without passing by the first three wheels.

For the reverse motion steam will be admitted to the corresponding circumferential series of blades of wheels $p, q, r$, in the proper direction, and then to drum $s$.

Another important constructive detail of the turbine refers to the arrangement of the blades in the low pressure drum, said arrangement being schematically represented in Fig. 11. The turbines provided with the low pressure drum which have been made so far, have said drum provided with blades having an equal axial dimension, the distributing blades having also the same axial dimension as the rotating blades; or else the various blades are sub-divided in two or three groups, each group having a larger radial dimension as it progresses toward the outlet, always preserving however the equal axial dimension of both rotating and distributing blades.

With my new arrangement (Fig. 11), I have the blades sub-divided in different groups, having an increasing radial dimension, but at the same time while their radial dimension is increased, their axial dimension is also increased; and this always preserving the rule of keeping the axial dimension of the distributing blades larger than that of the wheel served by the same, so that the peripheral pitch of the distributing blades is considerably larger than that of the corresponding wheels; this construction is advantageous inasmuch as it brings economical advantages in the operation.

It is, of course, understood that while I refer to a steam turbine both in the specification and claims, the turbine forming the object of my invention can also be used in connection with other elastic fluids under pressure.

The various details of my invention can be changed to a certain extent without departing from the spirit of the same; I reserve myself the right of bringing to my invention all those changes and modifications which may better answer the different requirements to be had in different cases and which may enter fairly into the scope of the appended claims.

I claim:

1. In a steam turbine plant, the combination of a high pressure chamber provided with a steam inlet, a low pressure chamber provided with a steam outlet, a plurality of wheels mounted in parallel planes within said high pressure chamber, part of said wheels being provided with a number of circumferential series of blades adapted to impart to said wheels a movement of rotation in the normal direction, and the remaining wheels being provided with a number of circumferential series of blades adapted to impart to said wheels a movement of rotation in the normal direction and with additional series of blades concentric to said circumferential series adapted to impart to said wheels a movement of rotation in the opposite direction, a drum provided with a number of circumferential series of blades adapted to impart to the same a movement of rotation in the normal direction mounted within said low pressure chamber, and a drum provided with a number of circumferential series of blades adapted to impart to the same a movement of rotation in the opposite direction also mounted within said low pressure chamber.

2. In a steam turbine plant, the combination of a high pressure chamber provided with a steam inlet, a low pressure chamber provided with a steam outlet, a plurality of wheels mounted in parallel planes within said high pressure chamber, part of said wheels being provided with a number of circumferential series of blades adapted to impart to said wheels a movement of rotation in the normal direction, and the remaining wheels being provided with a number of circumferential series of blades adapted to impart to said wheels a movement of rotation in the normal direction, and with additional series of blades concentric to said circumferential series adapted to impart to said wheels a movement of rotation in the opposite direction, a drum provided with a number of circumferential series of blades adapted to impart to the same a movement of rotation in the normal direction and a drum provided with a number of circumferential series of blades adapted to impart to the same a movement of rotation in the opposite direction mounted within said low pressure chamber, partitions between adjoining wheels dividing said chambers into sections, means for admitting steam in the sectional chambers thus formed, connections between sections inclosing wheels adapted to rotate in one direction, and sections inclosing wheels adapted to rotate in two directions, valves controlling said steam admitting means and said connections, and means for operating said valves to regulate the amount of steam sent into the said chambers and the course followed by the same according to speed and direction of motion desired; substantially as described, and for the purposes as set forth.

3. In a steam turbine plant, and in combination with a source of steam supply, a high pressure chamber and a low pressure chamber each provided with a steam inlet, a plurality of wheels mounted in parallel planes within each chamber, said wheels being each provided with a number of circumferential series of blades adapted to impart to said wheels a movement of rotation in the normal direction, the wheel or wheels mounted in close proximity of said steam inlets being provided with a larger number of blade series, a plurality of additional wheels mounted in parallel planes within said high pressure chamber, each provided with a number of circumferential series of blades adapted to impart to said wheels a movement of rotation in the normal direction and with additional series of blades concentric to said circumferential series adapted to impart to said wheels a movement of rotation in the opposite direction, a drum provided with a number of circumferential series of blades adapted to impart to the same a movement of rotation in the normal direction, and a drum provided with a number of circumferential series of blades adapted to impart to the same a movement of rotation in the opposite direction mounted within said low pressure chamber, partitions between adjoining wheels dividing said chambers into sections, means for admitting steam in the sectional chambers thus formed, connections between sections inclosing wheels adapted to rotate in one direction and sections inclosing wheels adapted to rotate in two directions, valves controlling said steam admitting means and said connections, and means for operating said valves to regulate the amount of steam sent into the said chambers and the course followed by the same according to speed and direction of motion desired; substantially as described, and for the purposes as set forth.

4. In a steam turbine plant, the combination of a high pressure chamber provided with a steam inlet, a low pressure chamber provided with a steam outlet, a plurality of wheels mounted in parallel planes within said high pressure chamber, the wheels mounted at the inlet end being each provided with a number of circumferential series of blades adapted to impart to said wheels a movement of rotation in the normal direction, and the remaining wheels being each provided with a number of circumferential series of blades adapted to impart to said wheels a movement of rotation in the normal direction, and with additional series of blades concentric to said circumferential series adapted to impart to said wheels a movement of rotation in the opposite direction, rotatable elements adapted to rotate in the normal direction, and another rotatable element adapted to rotate in the opposite direction within said low pressure chamber, partitions in said chambers between adjoining wheels or elements, and valves and connections between the various sectional chambers thus formed, whereby steam can be caused to flow through the first two wheels adapted to rotate in the normal direction, then through the wheels adapted to rotate in both directions so as to cause the rotation of the same in the normal direction, then through the remaining wheels adapted to rotate in the normal direction. then through the rotatable elements within the low pressure chamber adapted to rotate in the normal direction, at the reduced speeds; through all the wheels adapted to rotate in the normal direction only and the rotatable elements within said low pressure chamber adapted to rotate in the same direction, at the high speeds; and through the wheels adapted to rotate in both directions so as to cause the rotation of the same in the reverse direction, and through the rotatable element within said low pressure chamber adapted to rotate in the reverse direction, when the reverse motion is desired; substantially as set forth.

5. In a steam turbine plant, and in combination with a source of steam supply, a high pressure chamber and a low pressure chamber each provided with a steam inlet, a plurality of wheels mounted in parallel planes within each chamber, said wheels being each provided with a number of circumferential series of blades adapted to impart to said wheels a movement of rotation in the normal direction, the wheel or wheels mounted in close proximity of said steam inlets being provided with a larger number of blade series, and the first two wheels mounted in close proximity of the high pressure inlet being of a larger diameter than the adjoining wheels, a plurality of additional wheels mounted in parallel planes within said high pressure chamber each provided with a number of circumferential series of blades adapted to impart to said wheels a movement of rotation in the normal direction, and with additional series of blades concentric to said circumferential series adapted to impart to said wheels a movement of rotation in the opposite direction, a drum provided with a number of circumferential series of blades adapted to impart to the same a movement of rotation in the normal direction and a drum provided with a number of circumferential series of blades adapted to impart to the same a movement of rotation in the reverse direction mounted within said low pressure chamber, partitions in said chambers between adjoining wheels or elements, valves and connections between the various sectional chambers thus formed, and means controlling said valves and connections whereby steam can be caused to flow through the first two wheels adapted to rotate in the normal direction, then through the wheels adapted to rotate in both directions so as to cause the rotation of the same in the normal direction, then through the remaining wheels adapted to rotate in the normal direction, then through the rotatable elements within the low pressure chamber adapted to rotate in the normal direction, at the reduced speeds, through all the wheels adapted to rotate in the normal direction only and the rotatable elements within said low pressure chamber adapted to rotate in the same direction, at the high speeds; and through the wheels adapted to rotate in both directions so as to cause the rotation of the same in the reverse direction, and through the rotatable element within said low pressure chamber adapted to rotate in the reverse direction, when the reverse motion is desired, and whereby steam can be admitted directly through the low pressure inlet jointly with, or independently of the steam coming from the high pressure chamber; substantially as set forth.

6. In a steam turbine plant, and in combination with a source of steam supply, a pressure chamber provided with a steam inlet, a plurality of wheels mounted in parallel planes within said chamber adapted to rotate in the normal direction, partitions between adjoining wheels, means for admitting steam to the various sectional chambers thus formed, and means for admitting steam to said inlet comprising two main valves, each having an inlet and an outlet chamber, a plurality of elementary valves in each outlet chamber adapted to connect said outlet chamber with said steam inlet, means under the control of the operator for actuating one of the said main valves or for jointly actuating both main valves, and means for independently actuating said elementary valves; for the purposes as set forth.

7. In a steam turbine plant, and in combination with a source of steam supply, a pressure chamber provided with a steam inlet, a plurality of wheels mounted in parallel planes within said chamber adapted to rotate in the normal direction, a plurality of additional wheels adapted to rotate in the normal direction, a plurality of additional wheels adapted to rotate in the reverse direction, a separate steam inlet for the same, partitions between adjoining wheels, means for admitting steam to the sectional chambers thus formed, and means for admitting steam to said inlets comprising two main valves for the first and one valve for the second mentioned inlet, said two main valves each having an inlet and an outlet chamber, a plurality of elementary valves in each outlet chamber adapted to connect said outlet chamber with said steam inlet, means under the control of the operator for opening one or both main valves, or for opening the remaining valve while the said two main valves remain closed, and means for independently actuating said elementary valves; for the purposes as set forth.

8. In a steam turbine plant, and in combination with a source of steam supply, and with wheels adapted to be rotated in the normal direction, and wheels adapted to be rotated in the reverse direction, steam distributing devices for admitting steam to said wheels, said devices comprising two main valves for admitting steam to the first mentioned wheels, one valve for admitting steam to the second mentioned wheels, and cam-acting means under the control of the operator for actuating said valves.

9. In a steam turbine plant, and in combination with a source of steam supply, a pressure chamber, a set of wheels mounted therein adapted to rotate in the normal direction, a set of wheels adapted to rotate in the reverse direction, steam inlets for each of said sets of wheels, two main valves for admitting steam to the first set of wheels, one valve for admitting steam to said second set of wheels, and a cam-acting element operating first one and then the other main valve when moved in one direction, and operating the remaining valve when moved in the opposite direction.

10. In a steam turbine plant, and in combination with a source of steam supply, a pressure chamber, a set of wheels mounted therein adapted to rotate in the normal direction, a set of wheels adapted to rotate in the reverse direction, steam inlets for each of said sets of wheels, two main valves for admitting steam to the first set of wheels, one valve for admitting steam to the said second set of wheels, a cam-acting element operating first one and then the other main valve when moved in one direction, and operating the remaining valve when moved in the opposite direction, and a plurality of independently operated elementary valves inserted between each main valve and the steam inlet supplied by the same.

11. In a steam turbine, the combination of a pressure chamber, a plurality of wheels mounted in parallel planes within said chamber, partitions between adjoining wheels, an inlet for admitting steam to the first sectional chamber thus formed, a permanently open distributer through the partition dividing the first from the second chamber, an additional distributer through said partition, an inclosure for said additional distributer, a valve for admitting steam from the first sectional chamber to said inclosure, a distributer through the second partition, dividing the second from the third sectional chamber, an inclosure for said distributer, a connection between said second sectional chamber, and an intermediate sectional chamber, a connection between said second sectional chamber and said second mentioned inclosure, valves controlling said connections, a permanent connection between said second mentioned inclosure and the last sectional chamber, two main valves for admitting steam to said inlet, and means for controlling said valves and the remaining valves, causing the steam to flow from the first to the second sectional chamber through the permanently open distributer, then from the second to the intermediate, then to the last and third sectional chambers, then to the remaining chambers when one of said main valves only is open, and causing said steam to flow from the first to the second sectional chamber through both distributers, then from the second to the third and the remaining adjoining chambers, when both said main valves are open; substantially as set forth.

12. In a steam turbine, the combination of a pressure chamber, a plurality of wheels adapted to rotate in the normal direction mounted in parallel planes within said chamber, a second pressure chamber, a plurality of wheels adapted to rotate in both directions mounted in parallel planes within the same, partitions between adjoining wheels, an inlet for admitting steam to the first sectional chamber thus formed in said pressure chamber, a permanently open distributer through the partition dividing the first from the second chamber, an additional distributer through said partition, an inclosure for said additional distributer, a valve for admitting steam from the first sectional chamber to said inclosure, a distributer through the second partition, dividing the second from the third sectional chamber, an inclosure for said distributer, a connection between said second sectional chamber and the first sectional chamber of said second pressure chamber, a connection between said second sectional chamber and said second mentioned inclosure, valves controlling said connections, a permanent connection between said second mentioned inclosure and the last sectional chamber of said second pressure chamber, two main valves for admitting steam to said inlet, another inlet for admitting steam to the second pressure chamber when the wheels therein have to be rotated in a reverse direction, distributers through the partitions of said second pressure chamber for admitting steam to the wheels when rotating in the reverse direction, distributers for admitting steam to the same when rotating in the reverse direction, valves controlling said distributers, a main valve connected to said other inlet, and means for controlling said main valves and the remaining valves, causing the steam to flow from the first to the second sectional chamber of said pressure chamber through the permanently open distributer, then from the second to the first of said second pressure chamber, then to the intermediate and last of said second pressure chamber, then to the third and the remaining sectional chambers of said first pressure chamber when one of said main valves for the normal direction is open; from the first to the second sectional chamber of said first pressure chamber through both distributers, then from the second to the third and to the remaining sectional chambers of the same pressure chamber when both said main valves for the normal direction are open; and through said second inlet to the last, intermediate and first sectional chambers of said second pressure chamber, when said two main valves are closed, and is open the third mentioned main valve; substantially as set forth.

13. In a steam turbine, and in combination with a low pressure chamber, a drum provided with a plurality of circumferential series of blades increasing by groups both in the radial and axial dimensions from the inlet toward the outlet end, and stationary distributing series between adjoining circumferential series, each having the radial dimension substantially equal to the radial dimension of the adjoining circumferential series toward the outlet end, and the axial dimension larger than the axial dimension of said circumferential series; substantially as set forth.

14. In a steam turbine, the combination of a pressure chamber provided with an inlet, a plurality of wheels adapted to rotate in the normal direction mounted in parallel planes within said chamber, the first and second wheel adjoining said inlet, each having not less than four circumferential series of blades and having a larger diameter than the remaining wheels, said remaining wheels being each provided with three circumferential series of blades, a second pressure chamber, a plurality of wheels adapted to rotate in both directions mounted in parallel planes within the same, said wheels being each provided with four circumferential series of blades adapted to rotate said wheels in the normal direction, and with four additional series of blades concentric to said circumferential series, adapted to rotate said wheels in the reverse direction, partitions between adjoining wheels, a permanently open distributer through the partition dividing the first from the second chamber, an additional distributer through said partition, an inclosure for said additional distributer, a valve for admitting steam from the first sectional chamber to said inclosure, a distributer through the second partition, dividing the second from the third sectional chamber, an inclosure for said distributer, a connection between said second sectional chamber and the first sectional chamber of said second pressure chamber, a connection between said second sectional chamber and said second mentioned inclosure, valves controlling said connections, a permanent connection between said second mentioned inclosure and the last sectional chamber of said second pressure chamber, two main valves for admitting steam to said inlet, another inlet for admitting steam to the second pressure chamber when the wheels therein have to be rotated in a reverse direction, distributers through the partitions of said second pressure chamber for admitting steam to the wheels when rotating in the normal direction, distributers for admitting steam to the same when rotating in the reverse direction, valves controlling said distributers, a main valve connected to said other inlet, and cam-acting means for controlling said main valves and the remaining valves, causing the steam to flow from the first to the second sectional chamber of said pressure chamber through the permanently open distributer, then from the second to the first of said second pressure chamber, then to the intermediate and last of said second pressure chamber, then to the third and the remaining sectional chambers of said first pressure chamber when one of said main valves for the normal direction is open; from the first to the second sectional chamber of said first pressure chamber through both distributers, then from the second to the third and to the remaining sectional chambers of the same pressure chamber when both said main valves for the normal direction are open; and through said second inlet to the last intermediate and first sectional chambers of said second pressure chamber, when said two main valves are closed, and is open the third mentioned main valve; substantially as set forth.

15. In a steam turbine, the combination of a high pressure chamber divided in two compartments, a plurality of wheels adapted to rotate in the normal direction mounted in parallel planes within the first compartment, said compartment having a steam inlet, and the first and second wheels adjoining said inlet each having not less than four circumferential series of blades and having a larger diameter than the remaining wheels, said remaining wheels being each provided with three circumferential series of blades, a plurality of wheels adapted to rotate in both directions mounted in parallel planes within said second compartment, said wheels being each provided with four circumferential series of blades adapted to rotate said wheels in the normal direction, and with four additional series of blades concentric to said circumferential series, adapted to rotate said wheels in the reverse direction, partitions between adjoining wheels, a permanently open distributer through the partition dividing the first from the second chamber, an additional distributer through said partition, an inclosure for said additional distributer, a valve for admitting steam from the first sectional chamber to said inclosure, a distributer through the second partition, dividing the second from the third sectional chamber, an inclosure for said distributer, a connection between said second sectional chamber and the first sectional chamber of said second compartment, a connection between said second sectional chamber and said second mentioned inclosure, valves controlling said connections, a permanent connection between said second mentioned inclosure and the last sectional chamber of said second compartment, two main valves for admitting steam to said inlet, another inlet for admitting steam to the second compartment when the wheels therein have to be rotated in a reverse direction, distributers through the partitions of said second compartment, for admitting steam to the wheels when rotating in the normal direction, distributers for admitting steam to the same when rotating in the reverse direction, valves controlling said distributers, a main valve connected to said other inlet, a low pressure chamber, a drum provided with a plurality of circumferential series of blades adapted to rotate the same in the normal direction and another drum provided with a plurality of circumferential series of blades adapted to rotate the same in the reverse direction mounted therein, and means for controlling said main valves and the remaining valves, causing the steam to flow from the first to the second sectional chamber of said first compartment, through the permanently open distributer, then from the second to the first of said second compartment, then to the intermediate and last of said second compartment, then to the third and the remaining sectional chambers of said first compartment and to the low pressure chamber when one of said main valves for the normal direction is open; from the first to the second sectional chamber of said first compartment through both distributers, then from the second to the third and to the remaining chambers of the same compartment and then to the low pressure chamber when both said main valves for the normal direction are open; and through said second inlet to the last, intermediate and first sectional chambers of said second compartment, and then to the low pressure chamber through the drum for the reverse rotation when said two main valves are closed, and is open the third mentioned main valve; substantially as set forth.

16. In a steam turbine, and in combination with a high pressure chamber, a low pressure chamber, an inlet for admitting steam to said low pressure chamber independently of said high pressure chamber, a plurality of wheels mounted in parallel planes within said low pressure chamber, the one close to said inlet being provided with four circumferential series of blades adapted to rotate the same in the normal direction, and the remaining wheels being each provided with three such series of blades, a drum also mounted within said low pressure chamber, provided with a plurality of circumferential series of blades adapted to rotate the same in the normal direction, another drum provided with a plurality of circumferential series of blades adapted to rotate the same in the reverse direction, means for admitting steam from said high pressure to said low pressure chamber to actuate said normally rotating wheels and drum, and means for admitting steam from said high to said low pressure chamber to actuate said drum rotating in the reverse direction.

17. In a steam turbine, and in combination with a high pressure chamber, a low pressure chamber, an inlet for admitting steam to said low pressure chamber independently of said high pressure chamber, a plurality of wheels mounted in parallel planes within said low pressure chamber, the one close to said inlet being provided with four circumferential series of blades adapted to rotate the same in the normal direction, and the remaining wheels being each provided with three such series of blades, a drum also mounted within said low pressure chamber provided with a plurality of circumferential series of blades adapted to rotate the same in the normal direction, another drum provided with a plurality of circumferential series of blades adapted to rotate the same in the reverse direction, the radial and axial dimensions of said blades in both drums increasing from the inlet toward the outlet end, stationary distributing series between adjoining circumferential series of said drums having the radial dimension substantially equal to the radial dimension of the adjoining circumferential series toward the outlet end, and the axial dimension larger than the axial dimension of said circumferential series, means for admitting steam from said high pressure to said low pressure chamber to actuate said normally rotating wheels and drum, and means for admitting steam from said high to said low pressure chamber to actuate said drum rotating in the reverse direction.

18. The combination of a casing provided with a steam inlet, a shaft, a plurality of wheels mounted along said shaft provided with circumferential series of blades adapted to impart to said wheels a movement in normal direction, the wheel or wheels in close proximity of said steam inlet being provided with four or more circumferential series of blades and being of a larger diameter than the remaining wheels, and a plurality of wheels each provided with concentric series of blades adapted to impart to said wheels rotation in two opposite directions.

19. In a steam turbine plant the combination with a source of steam supply of a plurality of pressure chambers, main valves admitting steam from the mains, secondary valves admitting steam to said pressure chambers, a cam shaft controlling the operation of said secondary valves, and means under the control of the operator simultaneously controlling said cam shaft and said main valves.

20. In a steam turbine plant and in combination with a source of steam supply of a plurality of pressure chambers, main valves admitting steam from the mains, secondary valves admitting steam to said pressure chambers, a cam shaft operating said secondary valves and cam acting means under the control of the operator controlling the operation of said cam shaft and of said main valves.

21. In a steam turbine plant and in combination with a plurality of pressure chambers, a shaft, main valves admitting steam from the mains, secondary valves admitting steam to said pressure chambers for rotating said shaft in the normal direction, secondary valves admitting steam to said pressure chambers for rotating said shaft in the opposite direction, and means under the control of the operator simultaneously controlling the operation of said main valves and secondary valves, said means operating the valves so as to admit steam for imparting normal rotation to said shaft when moved in one direction, and operating valves so as to admit steam to said pressure chambers so as to impart the reverse rotation to said shaft when moved in the opposite direction.

22. In a steam turbine plant, the combination with a source of steam supply, of a high pressure section having a plurality of action wheels mounted therein, of a low pressure section having a plurality of action wheels, an action drum having a number of circumferential blades, means for supplying steam to the low pressure section, said means consisting of a group of nozzles mounted adjacent to the low pressure wheels concentrically and in arcuate series, and directed toward the remaining arcuate portion of the wheels; said nozzles being mounted to normally receive the steam exhausted from the high pressure section.

23. A steam turbine comprising a high pressure section, having a number of action disks for increasing speeds and for rotation in one direction and additional disks for rotation in either direction, the first single direction disk having at least four circumferential rows of blades on a circumference of a larger diameter than that of the remaining disks, and a low pressure section having a number of action disks and a drum with circumferential series of blades.

In testimony whereof I affix my signature in the presence of two witnesses.

GIUSEPPE BELLUZZO.

Witnesses:
B. CARLO SALVOTTI,
P. J. KEELAN.

Copies of this patent may be obtained for five cents each, by addressing the "Commissioner of Patents, Washington, D. C."